(12) United States Patent
Lillo et al.

(10) Patent No.: US 7,471,238 B2
(45) Date of Patent: Dec. 30, 2008

(54) MULTITARGET TRACKING ANTISPOOFING RECEIVER

(75) Inventors: Walter E. Lillo, Torrance, CA (US);
Kevin J. Scully, Cypress, CA (US);
Carlton D. Nealy, Redondo Beach, CA (US)

(73) Assignee: The Aerospace Corporation, El Segundo, CA (US)

( * ) Notice: Subject to any disclaimer, the term of this patent is extended or adjusted under 35 U.S.C. 154(b) by 81 days.

(21) Appl. No.: 11/264,053

(22) Filed: Nov. 1, 2005

(65) Prior Publication Data

US 2007/0096977 A1 May 3, 2007

(51) Int. Cl.
*G01S 1/00* (2006.01)
*G01C 21/00* (2006.01)
*H04B 1/00* (2006.01)

(52) U.S. Cl. .................... 342/357.02; 701/216; 375/150

(58) Field of Classification Search ................................
342/357.01–357.17, 108–109; 701/216,
701/200, 213–215; 375/343, 350, 367, 150
See application file for complete search history.

(56) References Cited

U.S. PATENT DOCUMENTS

| | | | | |
|---|---|---|---|---|
| 4,890,297 A * | 12/1989 | Zscheile et al. | ............. | 375/130 |
| 5,402,441 A * | 3/1995 | Washizu et al. | ............. | 375/150 |
| 6,148,022 A * | 11/2000 | Raghavan et al. | ........... | 375/146 |
| 6,311,129 B1 * | 10/2001 | Lin | ............................ | 701/214 |
| 6,693,882 B1 * | 2/2004 | Gu et al. | ...................... | 370/252 |
| 6,909,738 B2 * | 6/2005 | Akopian et al. | ............. | 375/142 |
| 6,990,140 B2 * | 1/2006 | Loomis et al. | .............. | 375/148 |
| 7,162,367 B2 * | 1/2007 | Lin et al. | ..................... | 701/220 |
| 7,224,721 B2 * | 5/2007 | Betz et al. | .................... | 375/152 |
| 2001/0020216 A1 * | 9/2001 | Lin | ............................ | 701/216 |
| 2002/0047799 A1 * | 4/2002 | Gustafson et al. | ....... | 342/357.12 |
| 2002/0109628 A1 * | 8/2002 | Diesel | .................... | 342/357.14 |
| 2003/0054755 A1 * | 3/2003 | Zehavi et al. | .................. | 455/1 |
| 2003/0058927 A1 * | 3/2003 | Douglas et al. | ............. | 375/147 |
| 2003/0072356 A1 * | 4/2003 | Abraham et al. | ............ | 375/148 |
| 2003/0201934 A1 * | 10/2003 | Asher et al. | ............ | 342/357.12 |
| 2004/0184516 A1 * | 9/2004 | Kohli et al. | .................. | 375/150 |
| 2004/0234008 A1 * | 11/2004 | Diggelen et al. | ........... | 375/343 |
| 2006/0188033 A1 * | 8/2006 | Zehavi et al. | ................ | 375/260 |

OTHER PUBLICATIONS

Donald B. Reid, Dec. 1979, IEEE Transactions on Automatic Control, VOI 6, "An Algorithm for Tracking Multiple Targets".*

* cited by examiner

*Primary Examiner*—Thomas H Tarcza
*Assistant Examiner*—Harry Liu
(74) *Attorney, Agent, or Firm*—Derrick Michael Reid

(57) ABSTRACT

A multitarget tracking antispoofing receiver utilizes multitarget tracking algorithms and multiple correlators for tracking signals of interest in a field of view about a nominal trajectory of a desired true signal for tracking targets within the code phase and carrier frequency signal space so as to predict when true and spoof signals will cross paths in the signal space without spoofing with loss of tracking of the desired signal so that true tracking of a desired target is maintained in the presence of a spoofing signal moving along a spoofing signal track and crossing a true path of the true signal.

8 Claims, 6 Drawing Sheets

MULTITARGET TRACKING NAVIGATION SYSTEM

MULTITARGET TRACKING NAVIGATION SYSTEM

MULTITARGET TRACKING ANTISPOOFING PROCESSOR

CARRIER MIXING UNIT

MULTITARGET TRACKING ANTISPOOFING TRACKING UNIT

CARRIER SPACE SPOOFER TRACKING PLOT

MULTITARGET TRACKING ANTISPOOFING RECEIVER

FIELD OF THE INVENTION

The invention relates to the field of GPS receivers. More particularly, the present invention relates to GPS receivers for tracking desired signals of a desired target and for tracking undesired signals of a spoofing target for maintaining tracking of the desired target.

BACKGROUND OF THE INVENTION

A spoofer signal is able to draw a receiver off of track of the true signal by sending a bogus signal, typically of higher power, across a target signals path in the signal space in code phase and carrier frequency. When there is a sufficiently slow divergence of the true and spoofer signals at the point where the spoofer signal and target signal cross over each other in the signal space, the signal tracker may end up following the more powerful spoofer signal. Spoofing is when the receiver is drawn off tracking of the target signal and disadvantageously tracks the spoofing signal when the receiver is designed to track only one signal in the field of view. The rate of divergence to draw the tracker off the target signal onto the spoofer signal depends upon the receiver operation. For IMU aided systems, the spoofer will have to diverge more slowly from the desired signal at the rate at which the paths cross. Typical tracking loops and ultra-tight systems may experience spoofing because tracking algorithms are designed to track only one signal within a very narrow field of view.

Traditional receivers have a very narrow field of view for tracking the desired signal. Hence they do not have information about other signals that might be close to the desired signal but not in the narrow field of view. The narrow field of view also means the tracker must have very limited uncertainty concerning the signal in order to observe the target signal. That is, existing methods track only one signal and for this reason, existing methods are not well positioned to function properly in the presence of a spoofer. Adaptive antenna antispoofing systems decrease the power level in the direction of the spoofer or maximize the power level in the direction of the desired signal. The adaptive antenna methods require multiple antenna elements. Signal processing methods rely on carrier techniques. These methods offer some improvement by reducing the bandwidth but still suffer from limitations regarding the size of the field of view and the fact that the device does not track multiple signals. The decreased size and reduced power consumption of electronics have resulted in fast processors, and small integrated circuits containing what was once an unthinkable number of GPS correlators. Integrated circuits with a large number of correlators allow the viewing of a wide field of view in the signal space but the wide field of view is only used in acquisition. Current receivers utilize tracking loops, which have a myopic field of view, and which are limited to the immediate estimated position of the track of interest.

With the increasing dependency on the Global Positioning System (GPS) for military and civilian navigation systems, it is important that the navigation receiver be able to withstand intentional signal interference with robust signal acquisition and tracking in the presence of jammers and spoofers. For this reason, inertial navigation systems have been coupled to GPS signal tracking and acquisition system for improved signal tracking and acquisition of the received signal. Inertial navigation systems (INS) have an inertial measurement unit (IMU) for processing inertial measurements. Coupling navigation data with the GPS signal tracking and acquisition system improves signal tracking and acquisition. When the inertial measurements of a navigation processor are used with a GPS signal tracking and acquisition system, the combined system is said to be tightly coupled. The tightly coupled GPS and INS method uses pseudorange and pseudorange rate measurements from the GPS receiver instead of the processed position and velocity measurements. In addition, inertial measurement unit data is usually used to assist the receiver tracking loops and enable more noise filtering than would be possible without tracking loop aiding. Ultra-tight GPS/IMU coupling further improves the performance by providing a tracking method of received Global Positioning System (GPS) signals using a correlation process that is driven by the best estimate of the navigation state vector based on inertial measurement unit samples from an inertial navigation system (INS) and GPS ephemeris data from a GPS satellite to generate replica signals for correlation with the received signals for determining pseudorange and pseudorange rate residual errors that in turn are used to update the navigation state vector for the next major cycle that generates the replica signal for the next major cycle.

All of these approaches have improved tracking and acquisition in the presence of jamming and spoofing by narrowing the received bandwidth and thereby reducing the effect of the interfering signal. The existing methods do not address the problems that occur when the spoofing signals are within the received bandwidth, instead a narrowing of the bandwidth is performed so that the spoofing signals will either not be within the signal space at all, or if inside the signal space, the spoofing signals will not remain within the signal space long enough to disturb the navigation solution. Existing receivers assume one signal is present and interpret the result of the correlation process accordingly. When in a tracking mode, the receivers examine a small portion of the signal space, which is half the width of the signal of interest and do not detect any signal outside of that region. A single correlation is based on a hypothesized value of the code and carrier, typically a receiver performs correlations on three code hypotheses the early, prompt, and late code hypotheses which typically span the width of a code chip, and one inphase and quadrature carrier hypothesis.

The pseudorange measurements are derived from an instantaneous sampling of the state of the code generator at a desired measurement epoch time. The pseudorange rate measurement is obtained by strobing the carrier loop twice over a small period of time and is a measure of a discrete change in pseudorange over a discrete period of time, determined from the carrier phase change. In the limit as the time interval goes to zero, the ratio of the delta pseudorange divided by delta time approaches the instantaneous time rate of change of the pseudorange, which is the pseudorange rate.

The tracking loops that track the incoming satellite received signal must adjust the phase and the frequency of the generated replica signal for many changing variables, such as user and satellite relative motion and user clock drifts. These tracking loops are traditionally called the code loop and the carrier loop, because the code loop tracks the phase of the Pseudorandom Noise (PRN) code and the carrier loop tracks the signal carrier frequency and the carrier phase. Although a phase-locked loop is the most common way to track a carrier signal, the GPS signals have a fifty-hertz navigation data message superimposed on the code generation process, which can potentially change the phase of the signal by 180 degrees every twenty milliseconds. To avoid a loss of lock when this occurs, a Costas tracking loop is used in place of the conventional phase lock loop. This allows the carrier to be tracked across 50 Hz data bit changes with no loss of lock.

Frequency lock loops are also used for the carrier tracking and sometimes are used in combination with phase lock loops to improve robustness.

The design of tracking loop transfer functions is compromised to meet two conflicting requirements. On one hand, it is desired to have a low bandwidth of the tracking loop to filter out as much noise as possible. On the other hand, if the tracking loop is too sluggish because of a low operating bandwidth, the tracking loop cannot track the dynamics of the relative motion often caused by vehicular acceleration. Inertial aiding applies to the use of data from an IMU to assist the tracking loops or the extrapolation of the user's position and velocity. When inertial aiding is used in the context of tracking loops, the relative motion between the satellite's antenna and the user's antenna can be predicted to a certain accuracy based on the IMU measurements and the position and velocity of a satellite evaluated from the ephemeris data. A reduction of the bandwidth of the tracking loop is possible with inertial aiding because the loop need only track the errors in the aiding information as opposed to the absolute motion. A narrower bandwidth has the advantage of filtering out more noise from the loop during tracking. Tracking loops have a small field of view. Inherent in the design of tracking loops is the tracking of only one signal.

GPS sets with IMU aiding, including those with communication receivers and navigation processors, must use a large enough tracking loop bandwidth to accommodate the dynamics of the relative vehicular motion and tolerate the associated noise filtering of the tracking loop. The IMU aided GPS sets are able to use narrower bandwidth tracking loops, which decreases broadband noise power and reduces the probability that a disturbance signal will survive the noise filtering. The IMU aided GPS sets use known user's relative motion through measurements from the IMU and the satellite position and velocity data evaluated from the ephemerides to compute the line-of-sight rate between the user's antenna and the GPS satellite for providing rate data to aid the tracking loop. This allows the tracking loop gains to be reduced to a lower bandwidth so that the tracking loop only tracks the errors relative to the nominal motion provided by the IMU, user clock, and ephemeris information. The signals corresponding to the errors in the clock and ephemeris are much lower in bandwidth than the signals corresponding to the position, clock, and ephemeris. When a tracking loop operation is aided by IMU measurement, the tracking loop is then to be tightly coupled with the IMU.

Even with IMU tight coupling, and with the lower tracking loop bandwidth, the tracking loop must maintain a lock on the signal by driving the internally generated replica signal to correlate with the received satellite signal. In a tightly coupled tracking loop, the aiding IMU information is used as reference motion, but the tracking loops must still use code and carrier phase error signals in a feedback loop to drive the internally generated replica signal to match the incoming satellite received signal. If the tracking loop fails to drive the error signal to zero, the amount of error that remains uncorrected is a measurement error that is fed into the navigation-processing algorithm as an unmodeled pseudorange and pseudorange rate measurement error. This time-correlated unmodeled pseudorange and pseudorange rate measurement error limits the allowable update rate of the navigation Kalman filter, because the assumption made in the Kalman filter processing is that the measurement errors are uncorrelated in time. This update rate limitation has traditionally limited the allowable processing rate of GPS measurements from an aided tracking loop to about one hertz. Although tracking loops use all of the data over the one-second interval to maintain lock, only the recent data prior to the measurement time is actually used to generate the pseudorange and pseudorange rate measurements. Most of the available inphase (I) and quadrature (Q) correlation output measurement data over the one-second interval is essentially used to keep the tracking loop in lock. But, all of this I and Q information is not necessarily used to improve the pseudorange and pseudorange rate measurement accuracy due to the fading memory of the tracking loop having a lower but limited bandwidth. Aided tracking loops have a narrow bandwidth but still suffer from an inability to track multiple signals and the narrow field of view.

When the tracking loop error builds beyond a certain threshold value, the loop is deemed to be out of lock and pseudorange and pseudorange rate measurements are not made until the loop reacquires lock. This out of lock condition is due to the nonlinearity of the correlation process and the use of linear loop designs that are only valid for small error conditions. If the loop loses lock, the received signal must then be reacquired. The reacquisition search process requires higher received signal strength than the tracking process, so when there is a marginal signal-to-noise situation for tracking, the loop may never reacquire lock.

A GPS receiver has multiple channels, one for each satellite tracked. Each GPS channel has a respective code tracking loop and carrier tracking loop that operates independently of each other. Hence, one tracking loop may lose lock due to a low signal-to-noise ratio even though other GPS channels are being normally tracked. The information from the other good channels is not used in the inoperative channel that may be out of lock due to a marginal signal to noise ratio that is insufficient to maintain lock.

The traditional tracking loop approach determines the code phase measurement independently of the carrier phase measurement and determines the pseudorange and pseudorange rate measurements independently on each of the two L1 and L2 GPS frequencies. Each of these four measurements is independently computed. Yet these measurements are not independent because these measurements are received by only one antenna. These measurements have not been processed dependently to provide enhanced measurement accuracy and robustness that can more readily overcome interference when used collectively.

Advanced tracking loop designs have been proposed to alleviate some of the loss of lock and reacquisition problems by tightly coupling IMU data with the carrier and code tracking loops. Prior tightly coupled systems are limited by the use of Costas carrier loops for determining twenty-millisecond bit boundary data without required a priori knowledge of the data bits. Conventional tracking loops require this data bit boundary knowledge in real time to support the correlation process. Some systems have been proposed for operating a Kalman filter at a much higher rate so that the Kalman filter is considered a part of the tracking loops. These approaches suffer from the requirement for huge processor throughput because the Kalman filter, that may have twenty or more state variables, must operate at several tens of Hertz.

With unlimited integration Kalman filter processor throughput, the integration Kalman filter could be operated at extremely high rates with no loss of optimality due to time correlated tracking loop errors. This high rate operation is similar to what has been called a vector delay lock loop. A vector delay lock loop is a method to track all satellites in view simultaneously with one common algorithm. The vector delay lock loop broadens the normal aided and unaided tracking loop design approach to both code and carrier tracking on all in-view satellites. The entire algorithm must run at very high processing rates because there is no provision for federated processing. The advanced tracking loops, similar to vector loops, still have a narrow field of view for tracking only one signal and do not allow for the concurrent tracking of multiple signals.

Ultratight GPS IMU Coupling (UTC) overcomes the current processor throughput limitations, as current processors cannot support Kalman filter rates of several tens of Hertz with the large state vectors required for GPS inertial navigation. UTC decomposes the large Kalman filters into one or more federated Kalman filters within a Kalman filter processing architecture. For example, a large Kalman filter can be decomposed into two partitions including a large integration Kalman filter and high-rate prefilters that are more compatible with modern processing speed requirements. The fundamental principle is to decompose the complete formulation into suitable partitions such that the important bandwidths and models are appropriate for each partition. UTC also has the advantages that the pseudorange acceleration is estimated and the ionospheric effects are more accurately estimated using both code and carrier information. In addition, the UTC prefilters can provide goodness of fit information to the central filter so that parameter estimates are properly weighted. UTC prefilters employ discriminator and sequential filters for tracking only one signal in the narrow field of view. Multitarget tracking algorithms have been very well developed for various signal and image processing applications such as missile tracking. Typically multitarget tracking algorithms break up the process into detection, track initiation, track propagation, gating tracks, updating track hypotheses, trimming track hypotheses, and track termination. This type of processing has not been applied to GPS processing. Multitarget tracking algorithms have not been applied to GPS.

In traditional receivers, the integrate-and-dump process is limited to twenty-milliseconds due to the potential change of a data bit in the navigation message. A technique called data stripping is used to integrate for longer periods of time by using a priori knowledge of the data bit values. A large percentage of the future data bit values is predictable once it is collected, especially with prior knowledge of the data to be uploaded to the satellites. Although data stripping has been demonstrated to work, the results have been somewhat disappointing relative to predicted improvements and the logistics of determining the future navigation data message is cumbersome. Massive correlator chips are used to decrease acquisition time by checking many code phase hypotheses at one time. Once acquisition has been accomplished the receiver reverts to using only the early, prompt, and late code hypotheses and one carrier phase hypothesis, resulting in a narrow field of view.

Detection involves finding signals in the signal space. The signal space could be searched by directly examining the outputs of sensor elements that span the entire space at any given moment such a sensor system is often called a starring sensor. The signal space could be searched by fewer sensor elements that span the space over a period of time. This is referred to as the scanning sensor method. Typically the raw data from the sensors are filtered so as to separate signals from background noise. Detections are then characterized by power and location in the signal space. They are then assigned to one or more potential tracks or become part of a new track.

An effective disturbance signal must have some regularity in motion through the signal space. Gating algorithms employ signal motion models to compute an expected detection region for a track referred to as a gate. Detections that are far outside of the gate of a track will not likely be associated with that track. Detections far from any gate will cause new tracks to be initiated. Because it is possible that gating regions for various tracks overlap, detections can be tentatively assigned to more than one track hypothesis. All track hypotheses are propagated until such a time as the tracks become resolved. A track is resolved when the data points very strongly in favor of that track hypothesis over all others. Tracks are terminated after a few measurement cycles without a detection falling within proximity of its gate. When two signals cross it is possible for them to interfere with each other and give unusual measurements that do not fit either track. Multitarget tracking algorithms can anticipate and detect crossing signals, and sometimes will wait until the signals separate from each other before attempting to assign detections to tracks.

Previous GPS tracking methods have narrow fields of view that make it easy for the desired signal to drift outside of the field of view by tracking only one signal. The crossing of spoofing signals cannot be predicted and no context is available for the resolution of various tracks. The greater power of the spoofing signal aids in spoofing in traditional systems. The multiple dimensional nature of the signals are not utilized for tracking multiple signals of different types but only one signal of a given type. In addition, most existing methods disadvantageously use a narrow field of view when tracking in the field of view. These and other disadvantages are eliminated or reduced using the invention.

SUMMARY OF THE INVENTION

An object of the invention is to provide a system for tracking a target signal in the presence of a spoofing signal.

Another object of the invention is to provide a system for tracking a global positioning system (GPS) target signal in the presence of a spoofing signal.

Yet another object of the invention is to provide a system for tracking a GPS target signal in the presence of a spoofing signal in a code and carrier signal space within a field of view of a tracking receiver.

Still another object of the invention is to provide a system for tracking a GPS target signal in the presence of a spoofing signal in a code and carrier signal space within a field of view of a tracking receiver when the spoofing signal and GPS target signal occupy a cross over point in the code and carrier signal space.

A further object of the invention is to provide a system for tracking a GPS target signal in the presence of a spoofing signal in a code and carrier signal space within a field of view of a tracking receiver when the spoofing signal and GPS target signal occupy a cross over point in the code and carrier signal space using a multitarget tracking algorithm in the tracking receiver.

The invention is directed to a tracking receiver that tracks multiple received signals, such as GPS signals that use the same code. The receiver examines a much larger portion of the code and carrier signal space as a larger field of view about the cross over point corresponding to the point in the code and carrier signal space determined by the best estimate of the navigation state vector based on inertial measurement unit samples from an inertial navigation system and GPS ephemeris data from a GPS satellite. Many equally spaced replica signals in the code and carrier space are generated for correlation with the received signals forming a field of view of the code and carrier signal space that is much larger than the width of a single signal in both the code and carrier dimensions. The receiver will detect and track all signals that appear in the field of view.

The tracking receiver has a very large field of view and operates to track multiple concurrent signals in the field of view, one of which may be a desired target signal the others of which may be spoofing, undesired, jamming, or interfering signals. The breadth of the field of view allows the receiver to wait until the signals are resolved before making a decision as to which is the target signal and which are spoofing signals. Adjusting the position of the window field of view is critical to maintaining the ability to detect the signals and distinguish between the signals. Adjusting the position of the window is accomplished using a large field of view and inertial measurement unit (IMU) data. In the case where there is an interfering signal, the tracking receiver maintains track on the target signal. The tracking receiver tracks code phase and carrier frequency and power. The greater power of the spoofer is a distinguishing characteristic between the two signals and hence actually hinders its ability to interfere.

The tracking receiver utilizes an architecture that can be applied to many tracking systems including ultratight system. Conventional multitarget tracking algorithms are utilized to distinguish targets that might cross over in the code and carrier space. Consistency checks between the signals classified as satellite signals can be performed. Consistency checks can be employed in conjunction with directional techniques for tracking multiple signals. The massive correlator chips can be used as an enabling technology to determine the context about the trajectory and to properly classify signals that cross over each other. All detected signals can be tracked, and information can be kept regarding the dimensionality of the object as to how many signal types, power, direction, and motion in the code and carrier space, with compatibility with the IMU processing. Multitarget tracking algorithms are utilized to resolve the tracks of the signals.

When signal tracks have been sufficiently resolved, tracking information is fed to a prefilter and ultimately to the navigation filter. With a large number of correlators available to us, we have a significant field of view that enables continuous measurements of all signals of interest. The IMU information allows for a narrow gate for the true signal. The crossing of tracks can be anticipated and resolved without losing track on a desired object. The multitarget tracker is also able to track the spoofer's trajectory fairly well. The spoofer tracks have a greater process noise than the true signal because their motion in the code and carrier space is not tied to a physical phenomenon and hence there is no possibility of an aiding sensor trajectory for the spoofer. The tracking receiver has a large field of view for tracking multiple signals using signal characteristic. As such, the tracking receiver can track multiple signals, and maintain a lock on a target signal, even in the presence of cross over spoofing signals that cross over the target signal. These and other advantages will become more apparent from the following detailed description of the preferred embodiment.

DETAILED DESCRIPTION OF THE PREFERRED EMBODIMENT

Figure 1:
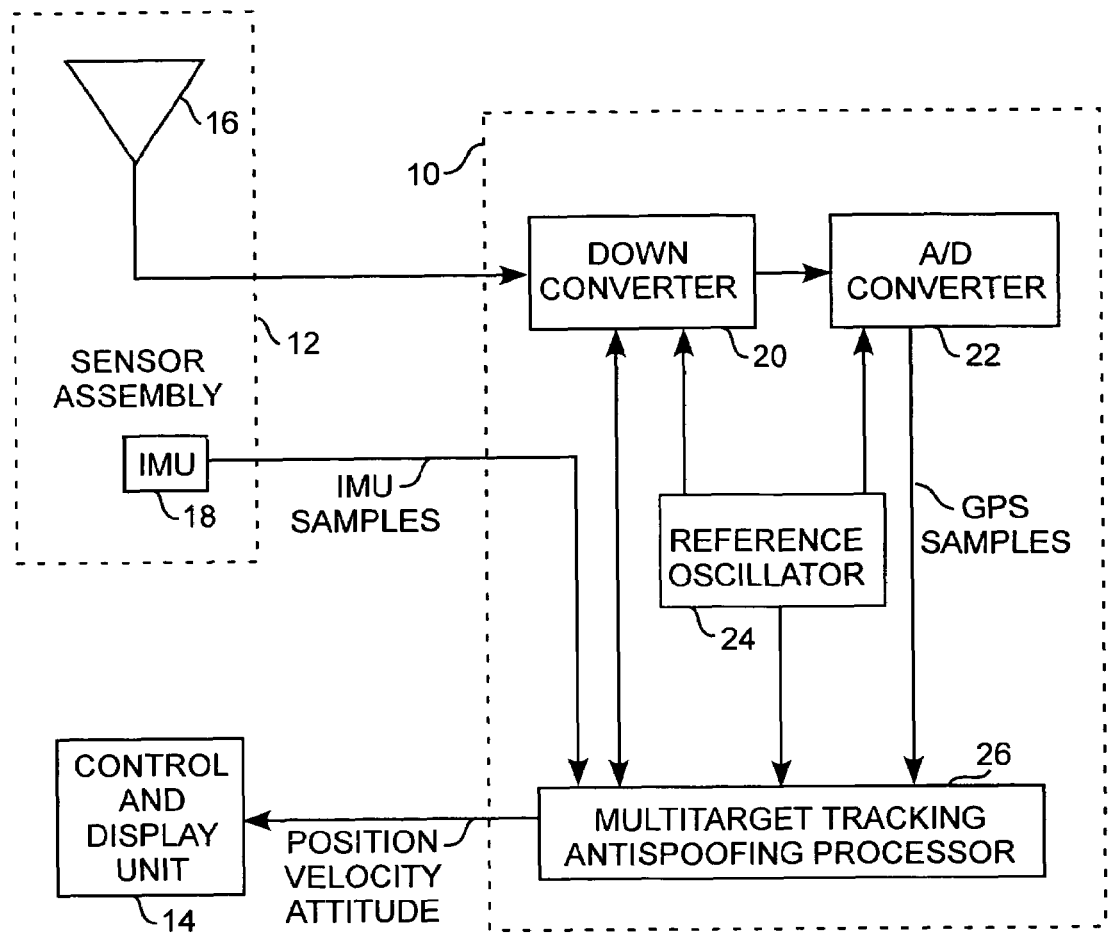
FIG. 1 is a block diagram of a multitarget tracking navigation system.

An embodiment of the invention is described with reference to the figures using reference designations as shown in the figures. Referring to FIG. 1, a global positioning system (GPS) inertial navigation system includes a navigation system 10 receiving GPS signals and inertial measurement unit samples from a sensor assembly 12 and provides position and velocity data to a control and display unit 14. The navigation system 10 functions as a GPS inertial navigation system tracking GPS signals from a plurality of in-view satellites, not shown. The sensor assembly 12 includes an antenna 16 for receiving and providing received GPS signals and includes an inertial measurement unit (IMU) 18 providing the IMU sample signals, both of which are communicated to the navigation system 10. In the preferred form, the IMU 18 may be a microelectromechanical system (MEMS) IMU embedded in the antenna 16. The navigation system 10 includes a downconverter 20 for frequency downconversion of the received GPS signals using a user's reference oscillator 24 providing an $f_o$ internal frequency reference, and includes an analog-to-digital (A/D) converter 22 communicating digitized GPS samples to a Multitarget Tracking Antispoofing (MTTAS) processor 26. The MTTAS processor 26 also receives the IMU samples and provides the position and velocity data to the control and display units 14.

Figure 2:
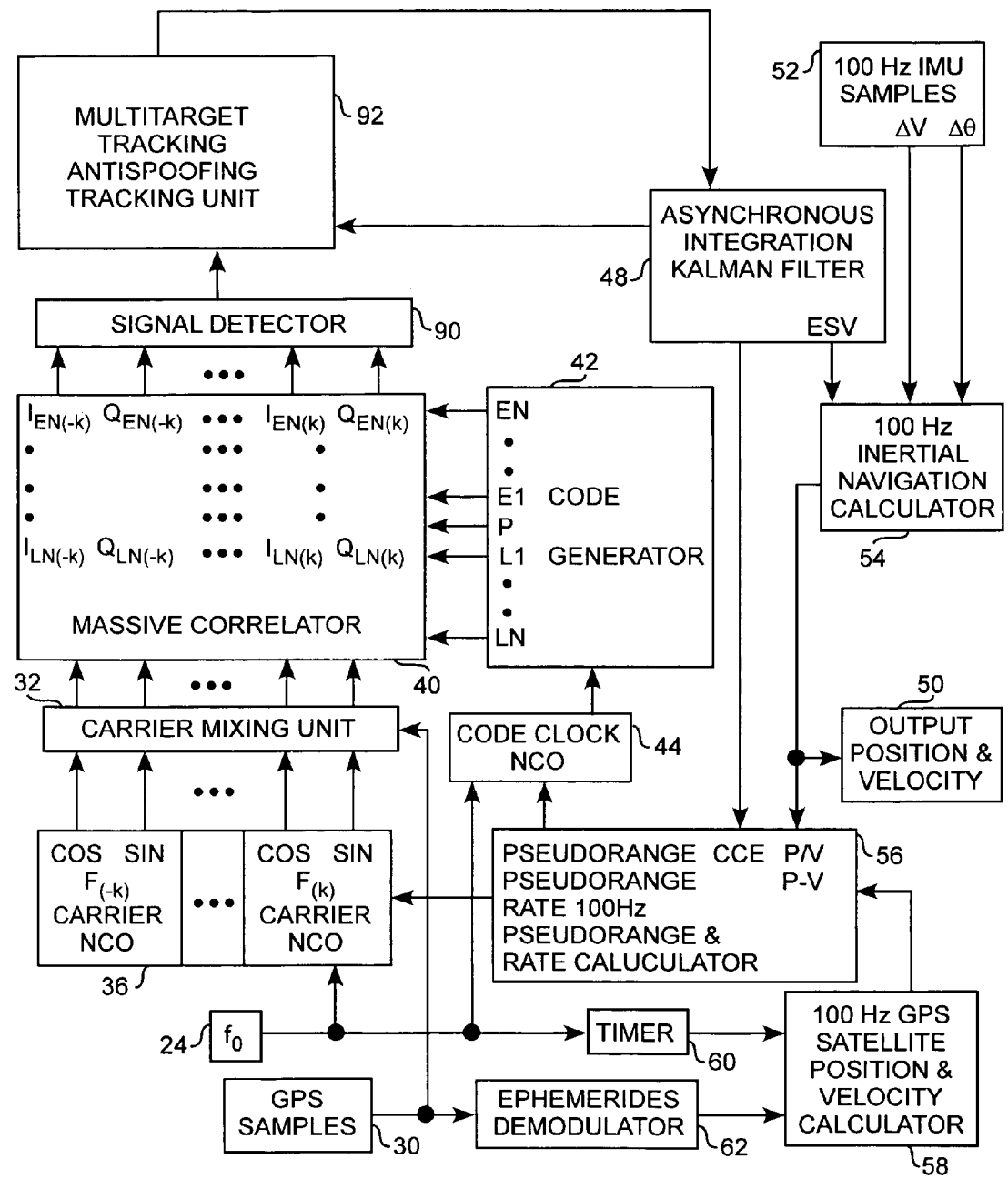
FIG. 2 is a block diagram of a multitarget tracking antispoofing processor.

Referring to FIGS. 1 and 2, and more particularly to FIG. 2, a massive correlator 40 multiplies the inphase and quadrature signals from the carrier mixing unit 32 by the early (E1, ..., EN), prompt (P) and late (L1, ..., LN) code replica signals from the code generator 42. The code generator 42 obtains the prompt signal P by applying an autocorrelation function to the current estimate of the code phase offset. The code generator 42 obtains the early signals by adding fixed amounts from the code phase offset estimate and applying the autocorrelation function. Similarly, the code generator 42 produces the late signals by subtracting fixed amounts to the code phase offset estimate and applying the autocorrelation function. This code phase offset estimate comes from the signal of the code clock NCO 44. The code clock NCO 44 adjusts the signal of the reference oscillator f0 24 using the pseudorange from the 100 Hz pseudorange and rate calculator 56.

The 100 Hz pseudorange and rate calculator 56 computes the geometric range and range rate from the IMU calculated receiver position and velocity (P/V) and the GPS calculated satellite position and velocity (P-V). The pseudorange is calculated by adding the clock phase error and other terms such as ionospheric and tropospheric delays to the geometric range. The pseudorange rate is computed by adding the clock frequency error estimate to the geometric range rate. P-V is obtained from the 100 Hz GPS satellite position and velocity calculator 58. The 100 Hz GPS satellite position and velocity calculator 58 generates P-V with timing signals from the timer 60 and ephemeris data extracted from the GPS samples 30 through the ephemerides demodulator 62.

The asynchronous integration Kalman filter 48 receives the code phase $\bar{\tau}_T$, carrier frequency offset $\bar{\phi}_T$, and the power $\bar{P}_T$, where T designates a truth tracker 108 of the MTTAS tracking unit 92, and produces estimates of the position, velocity and acceleration error in an error state vector (ESV). The 100 Hz inertial navigation calculator 54 uses the ESV and the differential velocity samples $\Delta V$ and the differential attitude samples $\Delta\theta$ taken from the 100 Hz IMU samples 52 to compute an estimate of the position and velocity P/V. The position and velocity P/V is then communicated to the 100 Hz pseudorange and rate calculator 56 and stored as output position and velocity 50 data. The 100 Hz pseudorange and rate calculator 56 also receives clock error estimates (CCE) from the asynchronous integration Kalman filter 48.

Figure 3:
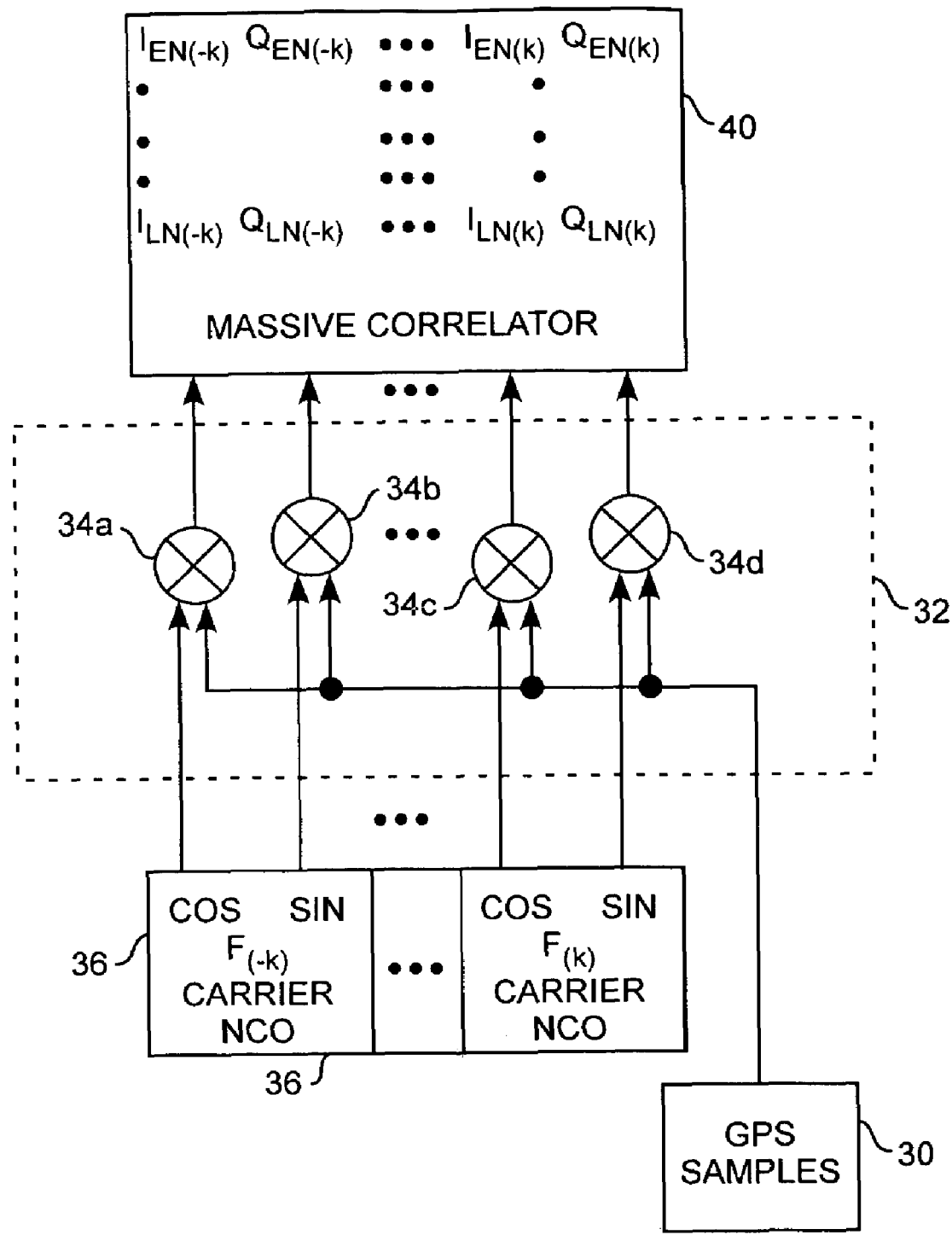
FIG. 3 is a block diagram of a carrier-mixing unit.
Figure 4:
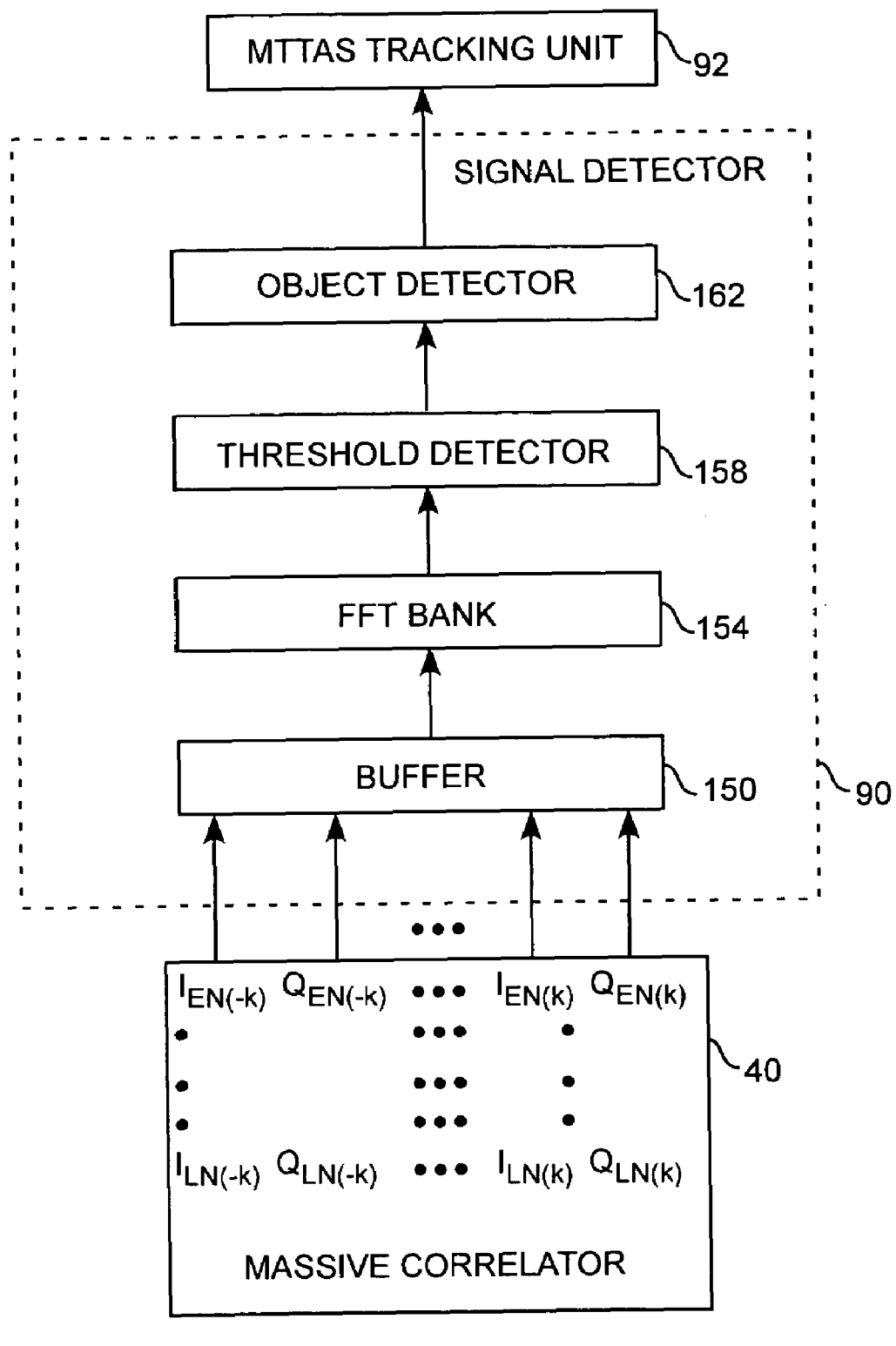
FIG. 4 is a block diagram of a signal detector.

Referring to FIGS. 1, 2, and 3, the GPS samples 30 are sent to the carrier-mixing unit 32. The carrier-mixing unit 32 contains several mixers 34a, 34b, 34c, and 34d. These mixers 34a, 34b, 34c, and 34d produce inphase I and quadrature Q signals using cosine and sine demodulation signals respectively from carrier numerically controlled oscillators 36. Each carrier NCO 36 produces a signal by adjusting the frequency of a signal from reference oscillator f0 24 using the pseudorange rate from the 100 Hz pseudorange and rate calculator 56. The frequencies of these carrier NCO 36 signals are fixed offsets of the current estimate of the carrier frequency of one desired signal. The term $F_{-k}$ is the kth negative offset of the carrier frequency estimate. The term $F_k$ is the kth positive offset of the carrier frequency estimate. The inphase and quadrature signals from the carrier-mixing unit 32 are sent to the massive correlator 40.

Referring to FIGS. 1 through 4, the massive correlator 40 sends sets of inphase I and quadrature Q GPS correlated sample signals from several hypothesized code phase and carrier frequency values. The hypothesized code phases and carrier frequencies are fixed offsets of the current estimates of the code phase and carrier frequency of one desired transmitter signal. For each offset of the code phase estimate and each offset of the carrier frequency estimate, there is a corresponding pair I and Q. The term $I_{EN(-k)}$ refers to the inphase sample obtained from the Nth positive offset of the current estimate of the code phase and the kth negative offset of the carrier frequency estimate. The term $I_{LN(k)}$ refers to the inphase sample obtained from the Nth negative offset of the code phase estimate and the kth positive offset of the carrier frequency estimate. The massive correlator 40 sends the I and Q samples to the signal detector 90. In the signal detector 90, the I and Q pairs accumulate as a complex number (I,Q) in vectors, with one vector for each hypothesized code phase and carrier frequency in the buffer 150 over a set length of time. These vectors of I and Q samples from the buffer 150 undergo a Fast Fourier Transform in the FFT bank 154. The FFT bank 154 produces one vector for each hypothesized code phase offset and carrier frequency. The term i is the index of the signal being tracked. This set of vectors is searched for values above a certain minimum threshold value by a threshold detector 158. From the relevant vector entries found by the threshold detector 158, an object detector 162 extracts the measurements $\tau_i$, $\phi_i$ and $P_i$. The term $\tau_i$ is the code phase offset from the current estimate of the code phase, the term $\phi_i$ is the carrier frequency offset from the current estimate of the carrier frequency, the term $P_i$ is the power of the transmitted signal, and the term i is the index of the signal being tracked. These estimates are then associated with previous estimates from the signal detector 90 by the MTTAS tracking unit 92.

Figure 5:
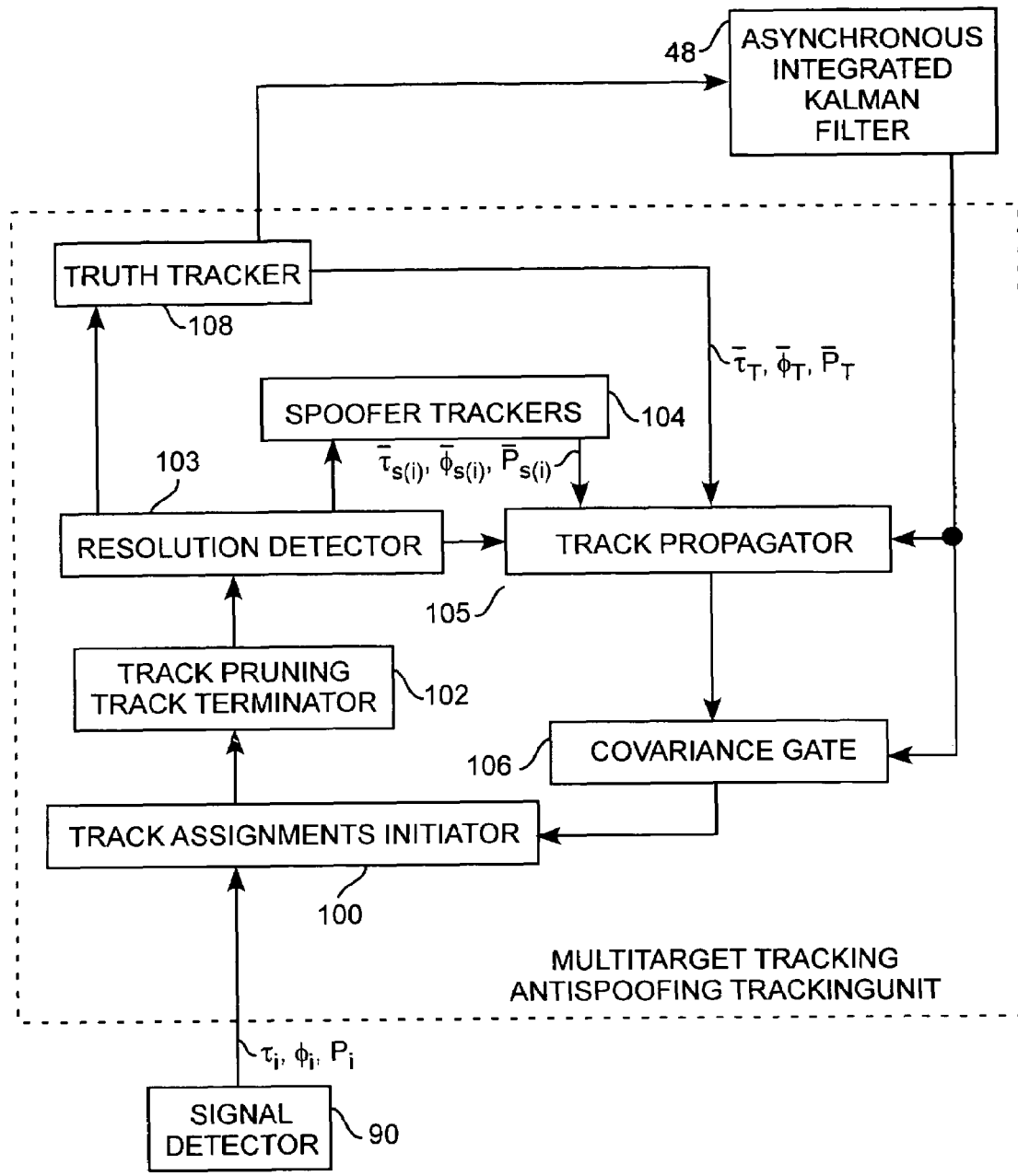
FIG. 5 is a block diagram of a multitarget tracking antispoofing-tracking unit.

Referring to FIGS. 1 through 5, and more particularly to FIG. 5, the MTTAS tracking unit 92, passes the measurements from the signal detector 90, one set per signal detected of code phase offset $\tau_i$, carrier frequency offset $\phi_i$ and power $P_i$, to the track assignment and initiation module 100. Having received predictions of $\tau_i$, $100_i$ and $P_i$, for each signal already being tracked, from the track propagator 105 by way of the covariance gate 106 module, the track assignment and initiation module 100 compares the input measurements to the predicted measurements. A gate function determines matches between input and a prediction by a numeric margin of error for the predicted measurement computed by the covariance gate 106, for the given track. Each gate, along with a covariance matrix for computing a weighted distance, forms a region around the associated predicted measurement of all points that lie within the covariance weighted distance of the prediction in the signal space. Using these gated regions, the track assignment and initiation module 100 associates each set of $\tau_i$, $\phi_i$ and $P_i$ to a current track and/or may start a new track beginning with $\tau_i$, $\phi_i$ and $P_i$ at the current time. When each actual measurement set falls within the gate of one and only one predicted measurement set and when the regions formed by each gate are sufficiently separated in the signal space, one current track will clearly correspond to one set of $\tau_i$, $\phi_i$ and $P_i$. When the gated regions come too close or overlap one another, the association of a measurement to an existing track will not be obvious. In these cases of ambiguity, the track assignment and initiation module 100 will create more tracks than necessary to ensure that the MTTAS tracking unit 92 continues to follow the desired signal. When no prediction comes close to a given measurement, the track assignment and initiation module 100 starts a new track with that measurement at that time. In situations where $\tau_i$, $\phi_i$ and $P_i$ cannot be very accurately predicted, the track assignment and initiation module 100 may assign measurements to a given track, even though the measurement lies outside the gated region.

When the assignment of a measurement to a current track is ambiguous, the track assignment and initiation module 100 will create spurious tracks. The track pruning and track terminator module 102 will eliminate these tracks as these tracks are determined unnecessary. This elimination of tracks will be performed according to heuristics used in other multitarget tracking applications, heuristics based on numeric measures of how well the predicted values fit the observed values. Tracks given too extreme a value according to these numeric measures will be eliminated. These numeric measures include the sum of the cost, the covariance weighted difference between the prediction and the actual measurement, at each time. These numeric measurements also include weighted sums of the costs that place more emphasis on times without ambiguous assignments and less emphasis on times with ambiguous assignments. The covariance matrix is computed by the covariance gate 106.

The tracks surviving the track pruning and track terminator module 102 are passed to the resolution detector 103 that determines whether a track corresponds to a desired signal, the truth, or to a spoofer signal and sends these tracks to the truth tracker 108 or the spoofer trackers module 104. When gated regions are sufficiently separated and track assignment is clear, the resolution detector 103 performs a trivial function. When a prolonged period of ambiguous or questionable assignments occurs, the resolution detector 103 monitors several tracks until the period of ambiguity ends and retroactively classifies the true signal and the spoofer signals. Information to make this classification will include the GPS signal structure, knowledge of likely transmitter and receiver positions and the power of the incoming signals. The truth tracker 108 and spoofer trackers 104 modules will filter the $\tau_i$, $\phi_i$ and $P_i$ values sent by the resolution detector 103 to account for measurement error and produce $\bar{\tau}_T$, $\bar{\phi}_T$, and $\bar{P}_T$, and $\bar{\tau}_{s(i)}$, $\bar{\phi}_{s(i)}$, and $\bar{P}_{s(i)}$ respectively.

The truth tracker 108 module supplies the asynchronous integration Kalman filter 48. The asynchronous integration Kalman filter 48 processes the code phase offset and carrier frequency offset measurements from the truth tracker 108 to produce an error state vector (ESV) estimating the position, velocity and acceleration errors and a clock error estimate (CCE). The asynchronous integration Kalman filter 48 also computes position, velocity, acceleration and time covariance values for these estimates. The truth tracker 108 only feeds the asynchronous integration Kalman filter 48 at times when the resolution detector 103 supplies the truth tracker 108. When the true signal and the spoofer signal have not been resolved, the asynchronous integration Kalman filter 48 receives no input. The asynchronous integration Kalman filter 48, at these times, nonetheless continues to provide output to all respective destinations.

The resolution detector 103 will pass measurements of $\tau_i$, $\phi_i$, and $P_i$ from unresolved tracks to the track propagator 105. The spoofer trackers 104 module will pass measurements $\bar{\tau}_{s(i)}$, $\bar{\phi}_{s(i)}$, and $\bar{P}_{s(i)}$ from resolved spoofer tracks to the track propagator 105. The asynchronous integration Kalman filter 48 will pass the ESV to the track propagator 105 from which a new estimate of the code phase and carrier frequency of the true signal will come. The asynchronous integration Kalman filter 48 also passes the clock error estimate CCE to the track propagator 105. The track propagator 105 takes tracks from these respective sources and will also use position, velocity, and time estimates derived from the asynchronous integration Kalman filter 48 input to estimate the code phase, carrier frequency and power at the next instant of time for each track. The covariance gate 106 uses the ESV and position, velocity, acceleration, and time covariance data from the asynchronous integrated Kalman filter 48 to compute a covariance matrix, an estimate of the confidence in the predicted measurements from the track propagator 105, for each track. The covariance gate 106 also computes the gate or margin of error for each prediction of the track propagator 105. The covariance gate 106 passes along the predicted measurements from the track propagator 105, the covariance matrices and the gates to the track assignments and initiation 100 module to repeat the track assignment cycle.

Figure 6:
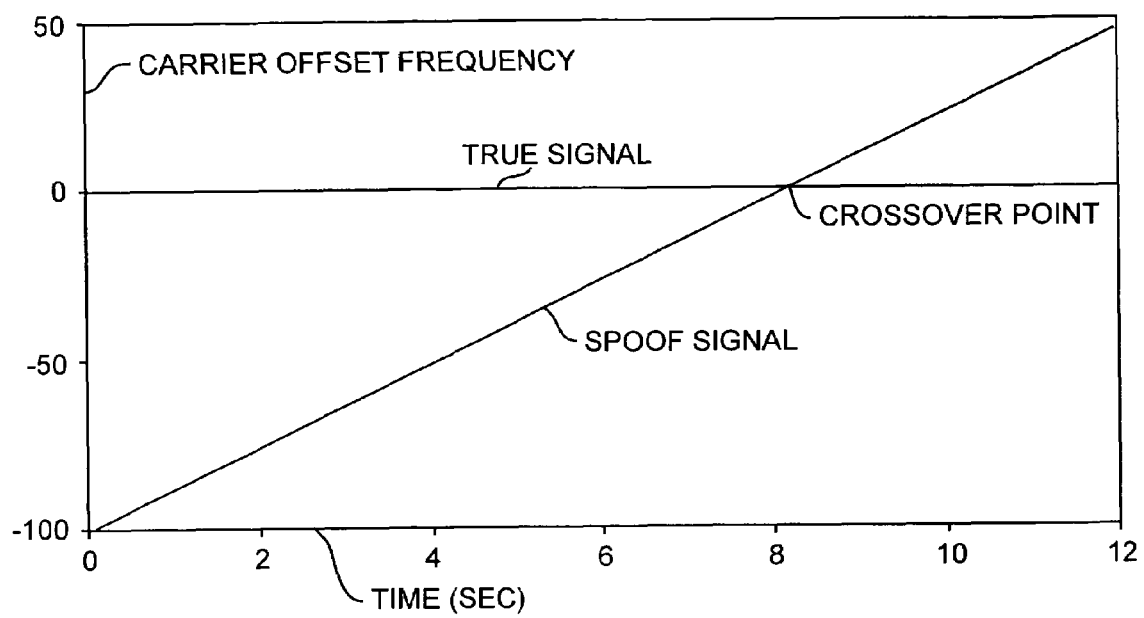
FIG. 6 is a plot of carrier space spoofer tracking.

Referring to all the Figures, and particularly to FIG. 6, the spoofer signal track moves across the code and carrier space in the field of view the tracking receiver. The spoofer signal may be generated in attempt to misguide the tracking of the desired signals also moving in a track in the code carrier space. The spoofer track intersects the target signal track at a cross over point where the MTTAS tracking unit 92 is subjected to two signals occupying the same point. At a time of eight seconds, the spoofer signal and the target true signal have the value in carrier offset frequency. The spoofer signal does not steer the tracking receiver off of the true signal. At the cross over point, the truth tracker 108 will continue to follow the true signal along the horizontal true track while the spoofer trackers 104 will continue along the diagonal spoofing track. In this manner, the tracking receiver continues to the true target signal in the presence of an intersecting spoofing signal.

The use of a massive correlator distinguishes this receiver from existing receivers. Most receivers use a correlator with three bins, one for the current estimate of the code phase offset, one for a negative offset of this estimate and one for a positive offset of this estimate. Some receivers, like this invention, contain a massive correlator with many more bins, using many offsets of both the code phase offset estimate and the carrier frequency offset estimate. The presence of many more correlator bins creates a much wider Field Of View (FOV). Existing receivers with massive correlators use the wider FOV for the acquisition of a single signal, when little information is known about that signal, and not to track multiple signals. By sending the data from the massive correlator, through the signal detector, to a multitarget tracking system, the MTTAS Tracking Unit 92, this receiver uses the wider FOV to follow multiple signals.

This ability to follow multiple signals represents the major defining difference between this invention and existing receivers. Existing receivers are not designed to follow spoofer signal in addition to the intended signal. In contrast, this invention does not use multitarget tracking algorithms to follow multiple signals, but can predict when signal tracks will cross. The expanded FOV allows autoregressive modeling of the spoofer signal's dynamics before there is an ambiguity between signals. This modeling provides a context, not available to existing receivers, for the resolution of tracks at a crossing of signals.

The tracking of the signal's power represents another defining difference between this invention and existing receivers. Traditional receivers search for the greatest power signal within the FOV, because these receivers assume only one signal. A spoofer with greater power than the desired signal is, thus, well suited to fool these receivers. By contrast, because this invention tracks power, the greater power becomes a distinguishing characteristic of the spoofer. The greater power now hinders the spoofer's ability to deceive.

The present invention can be used in the aircraft industry. The invention can be used for tracking GPS signals while preventing spoofing and disturbing signals from disrupting signal track.

The invention may also be of use to track reflected GPS signals from multiple satellites for determining the position of the reflectors. Those skilled in the art can make enhancements, improvements, and modifications to the invention, and these enhancements, improvements, and modifications may nonetheless fall within the spirit and scope of the following claims.

What is claimed is:

1. A system for tracking a first signal in a code phase and carrier frequency signal space in the presence of a second signal in the same code phase and carrier frequency signal space, the system comprising
    correlators for defining the code phase and carrier frequency signal space having a field of view encompassing the presence of the first signal and the second signal when not overlapping each other within the code phase and carrier frequency signal space, the first and second signals having the same carrier frequency and code phase defining the code phase and carrier frequency signal space, the first and second signals having different code phase offsets and carrier frequency offsets when not overlapping each other but remaining within the code phase and carrier frequency signal space,
    a detector for detecting the first and second signals in the code phase and carrier frequency signal space when not overlapping in the code phase and carrier frequency signal space, and
    a tracker for concurrently tracking the first signal and second signal in the code phase and carrier frequency signal space when the first signal and the second signal are and are not overlapping in the code phase and carrier frequency signal space.

2. The system of claim 1 wherein,
    the code phase and carrier frequency signal space is defined by a range of the code phase offsets and a range of the carrier frequency offsets,
    the tracker tracks the code phase and carrier frequency as the code phase offsets and carrier frequency offsets of the first and second signal change over time, the tracker is a multitarget tracker when tracking both the first signal and the second signal in the code phase and carrier frequency signal space, and the first signal and the second signal cross over each other at a cross over point in the code phase and carrier frequency signal space where the first signal and the second signal have the same code phase offset and carrier frequency offset when overlapping each other.

3. The system of claim 1 wherein the tracker implements a multitarget algorithm for assigning the first signal and the second signal to respective first and second hypothesized tracks in the code phase and carrier frequency signal space at a time before the first signal and the second signal overlap each other in the code phase and carrier frequency signal space, and, for assigning the first signal and the second signal to the respective hypothesized tracks after the time when the first signal and the second signal overlap each other in the code phase and carrier frequency signal space, so as to not confuse the tracking of the second signal with the tracking of the first signal in the code phase and carrier frequency signal space, and, in the event that the two signals never overlap but remain in close proximity in the code phase and carrier frequency signal space, the tracker uses the multitarget algorithm to distinguish between the the first and second signals from their relative positions and the first and second hypothesized tracks.

4. The system of claim 1 wherein, the code phase and carrier frequency signal space maintains at a center position an estimate of the code phase and carrier frequency of the first signal, the center position of the code phase and carrier frequency signal space is updated, using relevant data including pseudorange, pseudorange rate, and clock error, as the code phase offset and carrier frequency offset of the first signal changes over time, and the data to update the center position of the code phase and carrier frequency signal space comes from the tracking of the first signal and from the processing of inertial measurement and GPS sample data.

5. The system of claim 1, further comprising, a navigation calculator for receiving inertial measurement data and for determining position and motion of the system for adjusting a code phase offset of a replica code and for adjusting a carrier frequency offset of a replica carrier that are both fed to the correlators for maintaining coherent correlation of the first signal and the second signal.

6. The system of claim 1 wherein, the first signal is a GPS signal consisting of a series of message bits modulated by a pseudorandom noise chipping code and also modulated by a carrier frequency, the first signal, when sufficiently separated from the second signal in the code phase and carrier frequency signal space, uses the tracking system as a predictable series of code phase offset and carrier frequency offset measurements, and the first signal, at a given time, has unpredictable code phase offset and carrier frequency offset measurements, due to the second signal overlapping the first signal in the code phase and carrier frequency signal space, the first signal continually being tracked and resolved by the tracking system.

7. The system of claim 1 wherein, the second signal is selected from the group consisting of undesired signals and interfering signals and jamming signals and spoofing signals, the second signal will be recognized as predictably changing code phase offset and carrier frequency offset measurements over time, by the tracking system and will be distinguished from the first signal by these predictable code phase offset and carrier frequency offset measurements, and the second signal having code phase offset and carrier frequency offset measurements that are disjointed being uncorrelated over time and unpredictable, and the disjointed code phase offset and carrier frequency offset measurements will be prevented from corrupting the track of the first signal because these unpredictable and disjointed measurements do not, over time, fit a model given by the track of the first signal.

8. A system for tracking a first signal in a spreading code and carrier frequency signal space in the presence of a second signal in the same code phase and carrier frequency signal space, the system comprising correlators for defining the code phase and carrier frequency signal space having a field of view encompassing the presence of the first signal and the second signal when not overlapping each other within the code phase and carrier frequency signal space, the first and second signals having the same code phase and carrier frequency defining the code phase and carrier frequency signal space, the first and second signals having different code phase offsets and carrier frequency offsets when not overlapping each other but remaining within the code phase and carrier frequency signal space, a detector for detecting the first and second signals in the code phase and carrier frequency signal space when not overlapping in the code phase and carrier frequency signal space, and a tracker for concurrently tracking the first signal and second signal in the code phase and carrier frequency signal space when the first signal and the second signal are and are not overlapping in the code phase and carrier frequency signal space, wherein, the tracker implements a multitarget algorithm for assigning the first signal and the second signal to respective first and second hypothesized tracks in the code phase and carrier frequency signal space at a time before the first signal and the second signal overlap each other in the code phase and carrier frequency signal space, and, for assigning the first signal and the second signal to the respective hypothesized tracks after the time when the first signal and the second signal overlap each other in the code phase and carrier frequency signal space, so as to not confuse the tracking of the second signal with the tracking of the first signal in the code phase and carrier frequency signal space, and, in the event that the two signals are in close proximity to each other in the code phase and carrier frequency signal space, the tracker uses the multitarget algorithm to distinguish between the two signals from their relative positions and the hypothesized tracks.

* * * * *